(12) United States Patent
Gardner et al.

(10) Patent No.: US 7,751,826 B2
(45) Date of Patent: Jul. 6, 2010

(54) SYSTEM AND METHOD FOR E911 LOCATION PRIVACY PROTECTION

(75) Inventors: Michael R. Gardner, Plantation, FL (US); Wayne W. Ballantyne, Coconut Creek, FL (US); Zaffer S. Merchant, Parkland, FL (US)

(73) Assignee: Motorola, Inc., Schaumburg, IL (US)

( * ) Notice: Subject to any disclaimer, the term of this patent is extended or adjusted under 35 U.S.C. 154(b) by 632 days.

(21) Appl. No.: 10/279,567

(22) Filed: Oct. 24, 2002

(65) Prior Publication Data

US 2004/0203879 A1    Oct. 14, 2004

(51) Int. Cl.
*H04Q 7/20* (2006.01)

(52) U.S. Cl. .............. 455/456.1; 455/404.1; 455/404.2; 455/414.2

(58) Field of Classification Search .............. 455/456.1, 455/556.1, 556.2, 557, 572, 574, 404.1, 404.2, 455/414.2, 440, 456.3, 457, 90.3
See application file for complete search history.

(56) References Cited

U.S. PATENT DOCUMENTS

| | | | | |
|---|---|---|---|---|
| 5,495,525 | A * | 2/1996 | Walker et al. | 379/357.04 |
| 5,557,254 | A * | 9/1996 | Johnson et al. | 340/426.19 |
| 6,135,230 | A * | 10/2000 | Schenck et al. | 180/273 |
| 6,208,844 | B1 * | 3/2001 | Abdelgany | 455/82 |
| 6,351,236 | B1 * | 2/2002 | Hasler | 342/357.09 |
| 6,473,031 | B1 * | 10/2002 | Harris | 342/357.09 |
| 6,505,048 | B1 * | 1/2003 | Moles et al. | 455/456.1 |
| 6,518,919 | B1 * | 2/2003 | Durst et al. | 342/357.07 |
| 6,774,797 | B2 * | 8/2004 | Freathy et al. | 340/573.1 |
| 7,019,646 | B1 * | 3/2006 | Woodard et al. | 340/539.26 |
| 2001/0017598 | A1 * | 8/2001 | Townsend et al. | 342/357.1 |
| 2002/0022490 | A1 * | 2/2002 | Usui | 455/456 |
| 2003/0001774 | A1 * | 1/2003 | Harris | 342/357.1 |
| 2003/0017833 | A1 * | 1/2003 | Forrester | 455/456 |
| 2003/0050039 | A1 * | 3/2003 | Baba et al. | 455/404 |
| 2003/0096623 | A1 * | 5/2003 | Kim | 455/456 |
| 2003/0140219 | A1 * | 7/2003 | Sachs | 712/245 |
| 2004/0042576 | A1 * | 3/2004 | Anderson | 375/365 |
| 2005/0159142 | A1 * | 7/2005 | Giniger et al. | 455/414.3 |

OTHER PUBLICATIONS

Bell South, "BellSouth Touchstar Calling Number Delivery Blocking (Per Call)", publication date unknown (found prior to U.S. Appl. No. 10/279,567 filing date), Feb. 19, 2001.
Dowjones, "Sprint Plan to Use Chips to Track Cellphones Stirs Privacy Concerns", Nov. 13, 2000, pp. 1-3.
Qualcomm Incorporated CDMA Technologies, gpsONE enhanced by SnapTrack, "Position Location Solutions", pp. 1-3 ((found prior to U.S. Appl. No. 10/279,567 filing date), Feb. 13, 2001.

* cited by examiner

*Primary Examiner*—Tuan A Pham

(57) ABSTRACT

The invention relates to a system that enables power to be selectively applied to GPS circuitry in a cellular telephone or other mobile device only when a specific user input is detected. In one embodiment, power to the GPS circuitry may be enabled only when the user strikes the keys "9-1-1." In other embodiments, other types of GPS enablement or disablement may be employed, such as selectively decoupling the GPS antenna. In another embodiment, the user may depress a privacy bypass button, which alternately enables and disables power to the GPS circuitry. Cellular telephones or other communication devices may therefore activate GPS location service during an emergency call, or when a user wishes to allow their location to be determined, but protect the privacy of that user's location and movement at other times.

8 Claims, 3 Drawing Sheets

SYSTEM AND METHOD FOR E911 LOCATION PRIVACY PROTECTION

TECHNICAL FIELD

The invention relates generally to wireless communications. More specifically, the invention relates to mechanisms to selectively enable or disable GPS circuitry in a cellular telephone or other communications device.

BACKGROUND OF THE INVENTION

The Federal Communications Commission (FCC) has mandated that, by December 2002, all cellular telephone carriers must market handsets capable of providing an emergency locator service. This emergency locator service, known as E911, will enable personnel at the public safety answering point (PSAP) to pinpoint the location of a cellular telephone user dialing 911. This FCC mandate further requires that the user not be able to override the emergency locator service in the case of a 911 emergency call.

This technology has raised public concern that, in addition to being used for emergency location, the locator service may be used by cellular carriers or by others to track the movements of cell phone users without their consent. There is therefore a need for a system that complies with the FCC mandate for location service while providing maximum privacy protection for cell phone users.

One technology that is commercially used to attempt to protect the privacy of cellular telephone users is the *67 dialing feature offered by Bell South™ and others. This feature allows a cellular user to block caller ID transmission from a cellular handset by dialing *67 before placing a call. If the user dials *67 and then 911, however, caller ID transmission will not be blocked, and personnel at the PSAP will be able to view the caller ID data.

While this technology can be used to prevent the transmission of caller ID data, it does not protect against the collection or transmission of GPS location data. There is therefore a need for a system that can be used to selectively enable and disable the transmission of GPS location data, preserving the transmission of that data during true emergency calls but blocking the accidental or malicious activation of the GPS tracking feature. Other problems exist.

SUMMARY OF THE INVENTION

The invention overcoming these and other problems in the art relates in one regard to a system and method for selectively activating or deactivating E911 tracking service, in an embodiment by disabling power to GPS locator circuitry in a cellular telephone until the key sequence "9-1-1-Send" is detected. In one embodiment, the power to the GPS circuitry in a cellular handset may be activated by detection of a keypad sequence and the rotation of a physical switch to permit power delivery. When the handset detects the key sequence "9-1-1" it may output a signal that loads the switch into a "ready" position. When the user presses the "Send" button, the switch closes, enabling power to be delivered to the GPS circuitry. In other embodiments, the selective delivery of power may be controlled by software.

DETAILED DESCRIPTION OF EMBODIMENTS

Figure 1:
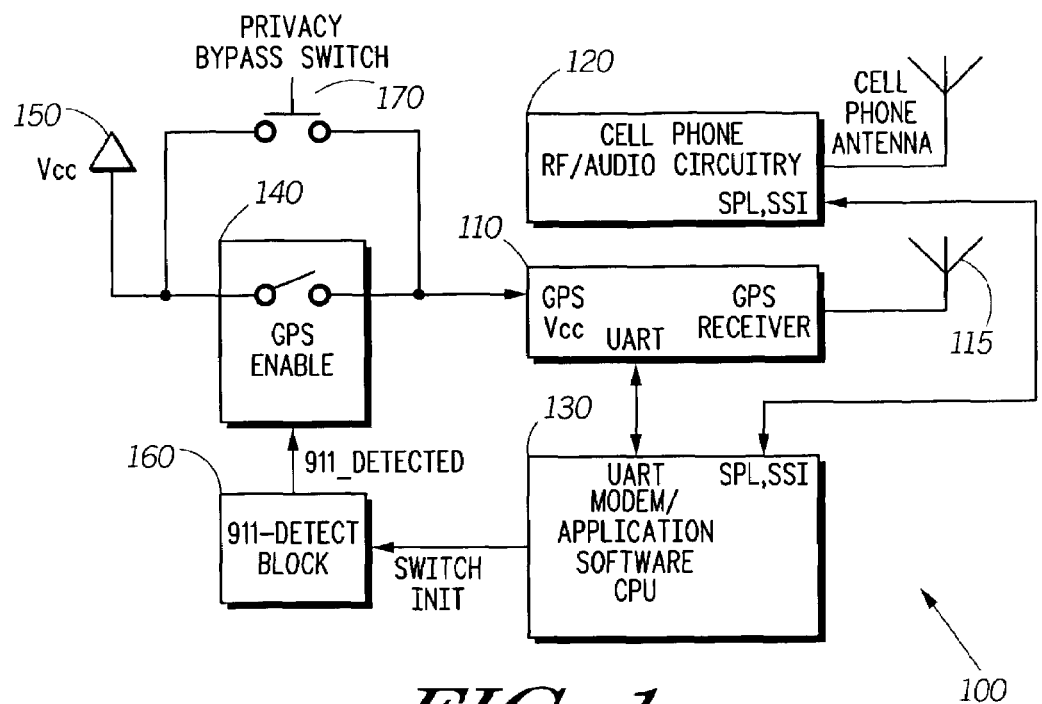
FIG. 1 is a block diagram of a cellular telephone system according to an embodiment of the invention.

FIG. 1 illustrates a block diagram of a cellular telephone system 100 in accordance with an embodiment of the invention. The cellular telephone system 100 may include an integrated GPS receiver 110 and GPS antenna 115. The cellular telephone system 100 may further contain a baseband processor 130 that is coupled to RF/audio circuitry 120, for instance via a serial control interface (SPI) and a synchronous serial interface (SSI), or other connections.

The baseband processor 130 may execute software known as modem software or otherwise to control the RF/audio circuitry 120 and access a radio channel. The baseband processor 130 may also interface to the GPS receiver 110 via a Universal Asynchronous Receiver/Transmitter (UART) or other connection.

In a 911 emergency call, the modem software may request a location fix from the GPS receiver 110 and forward the obtained location data to the E911 call center, Public Safety Answering Point (PSAP) or other control point using the RF/audio circuitry 120. In addition to executing the modem software, the baseband processor 130 may also execute other software including application software, such as a Java™ application, a Wireless Application Protocol (WAP) browser or others. Application software may independently request a location from the GPS receiver 110. If the request is granted, the application may receive the location data from the GPS receiver 110 and transmit the location, for instance via the UART.

In some cases, the user may wish to deny the delivery of location data to the application software. For this reason, the cellular telephone system 100 may contain a GPS enabling block 140, which may include a power switch. This GPS enabling block 140 may be coupled to a power bus 150 delivering DC or other power. In normal operation, the GPS enabling block 140 may be open and power to the GPS receiver 110 may be disconnected. This ensures that the GPS receiver 110 does not send location data to a local or remote application without the user's consent.

The cellular telephone system 100 may further contain 911-detect/control circuitry 160 coupled to the GPS enabling block 140. The function of this control circuitry is to ensure that the power to the GPS receiver 110 may be enabled when a 911 emergency call is made and a location fix is necessary. The FCC mandate requires that the user not be able to override the locator service when an emergency call is made. A user-controlled switch to activate the GPS receiver is therefore not fully compliant with the mandate, as a user could disable the locator mechanism in the case of a E911 call. 911-detect/control circuitry 160 consequently automatically enables power to the GPS circuitry when an E911 call is made.

When the 911-detect/control circuitry 160 detects the key sequence "9-1-1," it may assert a control signal 911_detect, which may activate the GPS enabling block 140. When the "Send" key is depressed, the GPS enabling block 140 may act to connect the power bus 150 to the GPS receiver 110. The baseband processor 130 may then send a location request to the GPS receiver 110, via the UART or otherwise. The GPS receiver 110 may obtain the location data for the cellular telephone system 100, and forward the data to the baseband processor 130 over the UART or other interface.

The baseband processor 130 may then communicate the location data via the RF/audio circuitry 120 through, for instance, a base station and mobile switch (MSC) to the PSAP or other control point. Once the E911 call is completed, the modem software running on the baseband processor 130 may assert a reset signal. This signal may cause the GPS enabling block 140 to disconnect power from the power bus 150, disabling power to the GPS receiver 110, and also causing the 911-detect/control circuitry 160 to return to a surveillance state.

In some cases, the user may wish to selectively allow an application to obtain location data not during an emergency call. In an embodiment, the cellular telephone system 100 may also contain a privacy bypass switch 170 coupled to the power bus 150 and the GPS receiver 110 to activate this option. When the user presses a privacy bypass key (for example, bypass button 710 illustrated in FIG. 7), the privacy bypass switch 170 may close. This may establish an alternate path from the power bus 150 to the GPS receiver 110 that circumvents the GPS enabling block 140 to enable power to drive the GPS receiver 110. The privacy bypass option may allow the user to override the location avoidance mechanism, and enable the GPS circuitry at selected or all times. With the privacy bypass switch 170 engaged, any software application running on the baseband processor 130 may therefore request and utilize location data until that selective operation is deactivated.

There are different ways to implement the 911-detect/control block 160 and the GPS enabling block 140. Each of these blocks may be implemented in hardware, in software, in firmware or mechanically, or a combination of those techniques. It is possible that certain software or firmware implementations may be less secure than mechanical guards, although those implementations may in cases cost less to install. For example, if a software implementation of the 911-detect/control block 160 and the GPS enabling block 140 is used, it may be possible for a wireless software application, such as a Java™ virus or a WAP script downloaded via the wireless carrier, to activate the GPS receiver 110 and determine the user's position.

For this reason, in embodiments the 911-detect/control block 160 may be implemented entirely in hardware logic and the GPS enabling block 140 implemented as a physical switch, such as a motorized electro-mechanical switch or other device. In embodiments, a keypad detect system may therefore be used to ensure that the inputs to the 911-detect/control block 160 are only asserted when a user physically strikes or depresses a key.

In embodiments of the invention, software or firmware may be employed exclusively, or in combination with some mechanical or electronic components, to selectively activate the GPS receiver 110. In one such embodiment of the invention the GPS enabling block 140 may be implemented as a physical switch such as a motorized electromechanical switch or other device, while the 911-detect/control block 160 may be implemented in software or firmware. In another embodiment, both the GPS enabling block 140 and the 911-detect/control block 160 may be implemented in software.

In this latter embodiment, registers may contain a Boolean or other variable, for example as "GPS_enabled" or other, to determine whether the transmission of GPS location data is currently permitted. The control software of the 911-detect/control block 160 may set this variable, in this embodiment. If the collection and/or transmission of GPS data is not allowed, the software may block this transmission by disallowing the application to make a location request to the GPS circuitry, by disallowing the UART to transmit GPS data, or by other action.

Figure 2:
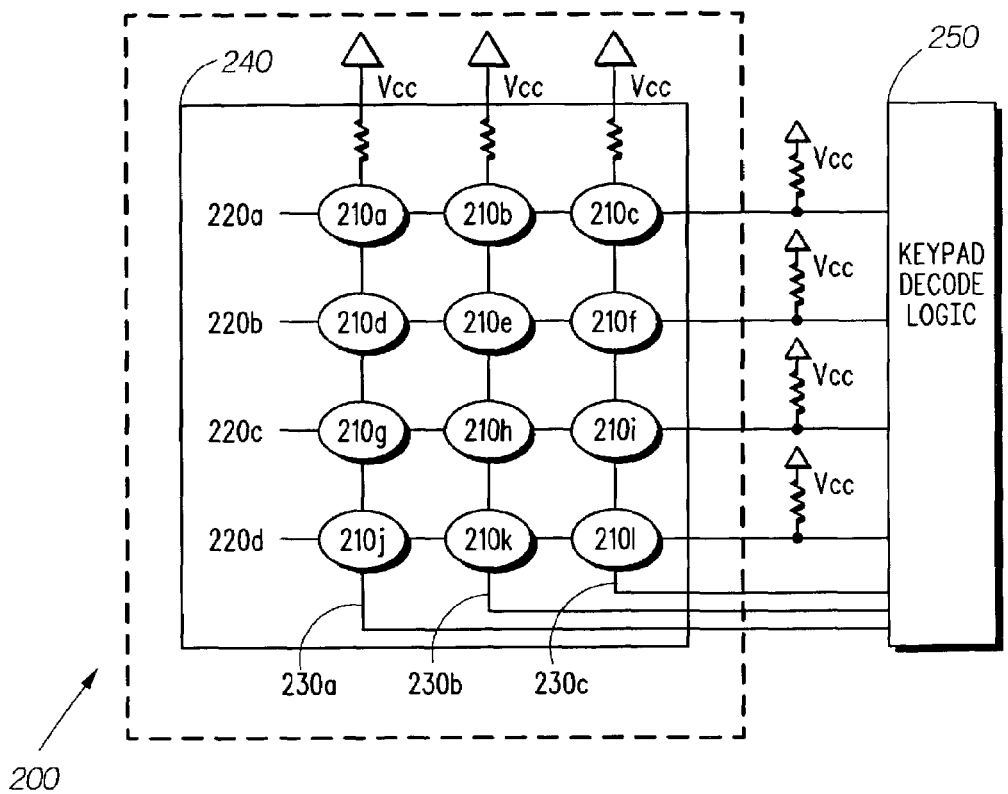
FIG. 2 is a diagram of a keypad matrix according to an embodiment of the invention.

FIG. 2 illustrates a diagram of a keypad matrix 200 in accordance with an embodiment of the invention. The keypad matrix 200 contains a plurality of keys 210a-l arranged in predetermined rows and columns. The plurality of keys 210a-l may be arranged such that each key in the set can be uniquely identified by its corresponding row and column. The keypad matrix 200 may connect to a plurality of row interconnects 220a-d, each row interconnect corresponding to a row of keys in the matrix. The keypad matrix may also connect to a plurality of column interconnects 230a-c, each column interconnect corresponding to a column of keys in the matrix. Each of the row interconnects 220a-d and each of the column interconnects 230a-c may be connected to a voltage pull-up.

The keypad matrix 200 may further contain a ground plate 240 situated beneath the keypad. When a user strikes a key, the row interconnect and the column interconnect corresponding to the key may be shorted to the ground plate 240. The row interconnects 220a-d and the column interconnects 230a-c may be connected to a keypad decoder logic block 250, which senses key contact and determines which key has been pressed.

Figure 3:
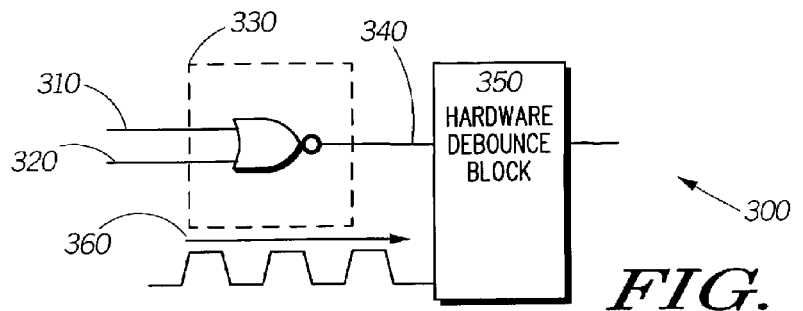
FIG. 3 illustrates keypad logic according to an embodiment of the invention.

FIG. 3 illustrates keypad logic 300 according to an embodiment of the invention. The keypad decoder logic block 250 of FIG. 2 may include a plurality of keypad logic systems 300. Each keypad logic system 300 in the decoder logic block 250 may correspond uniquely to one key in the plurality of keys 210a-l. The first input to the logic system, row_input 310, may be connected to the row that corresponds to this particular key. The second input, column_input 320, may be connected to the column that corresponds to this particular key. The logic system 300 further includes logic 330, which may be implemented as a NOR or other logical gate.

When the key corresponding to the logic system 300 is pressed, the row and the column corresponding to the key may be shorted to ground, and the inputs 310 and 320 may be set to a logical "0." The logic 330 then asserts the output signal 340. This output may then be routed to a hardware debouncer circuit 350. The hardware debouncer block 350 may additionally receive a clock input 360. The hardware debouncer circuit 350 serves to eliminate spurious key strokes by verifying that the key is continuously pressed for a minimum amount of time.

Figure 4:
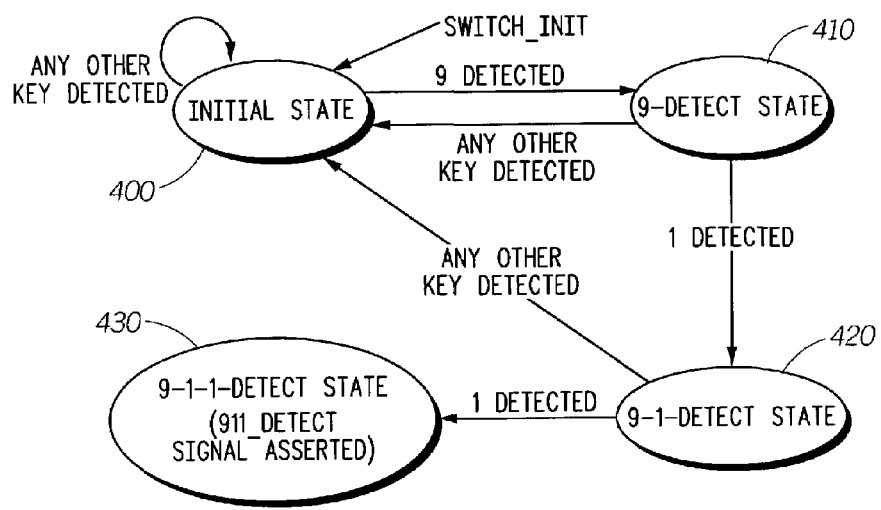
FIG. 4 is a state diagram of a finite state machine for control processing according to an embodiment of the invention.

FIG. 4 illustrates a state diagram of a control processor for controlling operation of the cellular telephone system 100, which may consist of or include a finite state machine (FSM), according to an embodiment of the invention. A FSM is one implementation of the 911-detect/control block 160 of FIG. 1, which functions to assert a control signal 911_detect when it detects the key sequence "9-1-1." The FSM in this embodiment may for instance be represented or implemented as a hardware logic state machine, for instance a Moore machine. The control operation is as follows: the control processor, such as a microprocessor, microcontroller, digital signal processor or other device may begin in an initial state 400. The initial state 400 can be entered in a number of ways.

For example, this state may be entered when the cellular telephone system 100 first powers up, when a call is ended, after a keypad entry has timed out or at other times. The modem software running on the baseband processor 130 may detect the situations in which it is desirable for the control processor to enter the initial state 400, and will assert a signal switch_init that causes the device to enter the initial state. From the initial state 400, if a "9" input is detected, the control processor may enter the 9-detect state 410. If any other input is detected while the control processor is in the initial state 400, the control processor may remain in the initial state.

From the 9-detect state 410, if a "1" input is detected, the control processor may enter the 9-1-detect state 420; if any other input is detected, the control processor may enter the initial state 400. From the 9-1-detect state 420, if a "1" input is detected, the control processor may enter the 9-1-1-detect state 430 and the output 911_detect is asserted. If any other input is detected, the control processor may enter the initial state 400. In the case of a 911 emergency call, the reset signal switch_init may be asserted when the call is ended, returning the control processor to the initial state 400.

It may be noted that the control logic described above may assert the 911_detect signal in the case of any key sequence including the key strokes "9-1-1." However, by law no telephone number may begin with the numerical sequence "9-1-1." Furthermore, for phone numbers in which the numerical sequence "9-1-1" is in the middle of the phone number, for example the phone number 643-9112, or for other keypad inputs such as wireless email text which might include a "9-1-1" string, power to the GPS circuitry will not be enabled. In this example, the 911_detect signal may be asserted after the key strokes "643-911" are detected; however, when the "2" key is detected, the control processor may return to its initial state 400 and the 911_detect signal may be deasserted. Therefore, the control signal will not be asserted when the "Send" key is depressed, and power to the GPS circuitry may not be enabled.

Even considering the bar on phone numbers including the numerical sequence "9-1-1," it may be desirable to implement the 9-1-1 logic detect circuit in an embodiment, to provide increased protection against inadvertent enabling of the GPS circuitry. In this case the control logic may ensure that the 911_detect signal was asserted only in the case where the key sequence "9-1-1" was detected without any preceding key strokes. One such embodiment is shown in FIG. 5.

Figure 5:
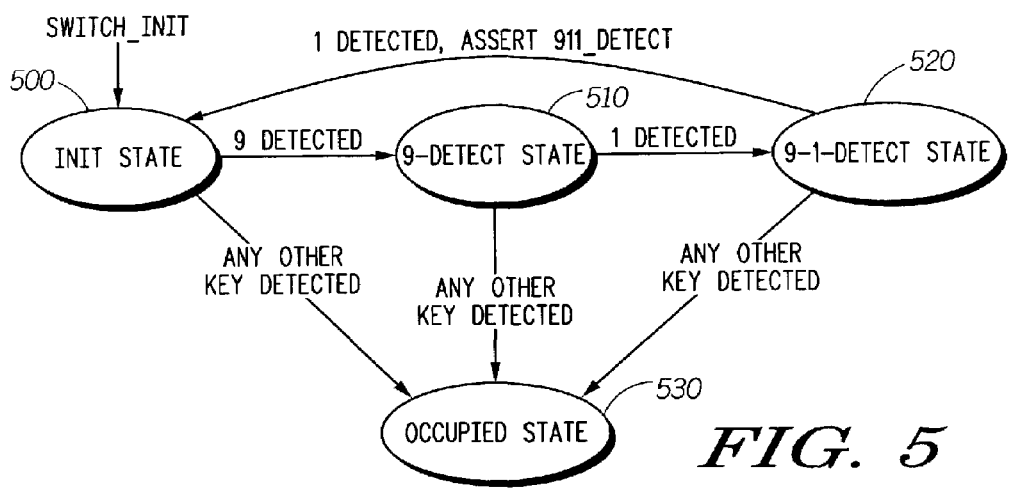
FIG. 5 is a state diagram of a finite state machine for control processing according to another embodiment of the invention.

FIG. 5 shows a state diagram of a control processor for controlling operation of the cellular telephone system 100, again consisting of or including a finite state machine, according to an embodiment of the invention. A software-controlled FSM may be one implementation of the 911-detect/control block 160 of FIG. 1, which functions to assert a control signal 911_detect when it detects the key sequence "9-1-1" with no preceding key strokes. The control processor in this embodiment is similar to the state machine reflected in FIG. 4. However, while the state machine of FIG. 4 is a Moore machine, the control processor illustrated in FIG. 5 may be implemented as a Mealy machine. The associated control logic also differs from that of FIG. 4 in that it eliminates the 9-1-1-detect state 430 and includes an "occupied" state 530. The control processor enters the occupied state 530 whenever it is determined that a call other than a 911 call is being placed.

The control processor begins in an initial state 500. The initial state 500 can be entered in a number of ways. For example, this state may be entered when the device first powers up, when a call is ended, after a keypad entry has timed out or at other times. In an embodiment, the modem software running on the baseband processor 130 may detect the situations in which it is desirable for the control processor to enter the initial state 500, and may assert a signal switch-_init that causes the control processor to enter the initial state. If a "9" input is detected while the control processor is in the initial state 500, the control processor may enter the 9-detect state 510. If any other input is detected while the control processor is in the initial state 500, the control processor may enter the occupied state 530.

From the 9-detect state 510, if a "1" input is detected, the control processor may enter the 9-1-detect state 520; if any other input is detected, the control processor may enter the occupied state 530. From the 9-1-detect state 520, if a "1" input is detected, the control processor may enter the initial state 500 and asserts the output 911_detect during the transition. If any other input is detected, the control processor may enter the occupied state 530. The control processor may remain in the occupied state 530 until the modem software or other input asserts the switch_init signal.

Figure 6:
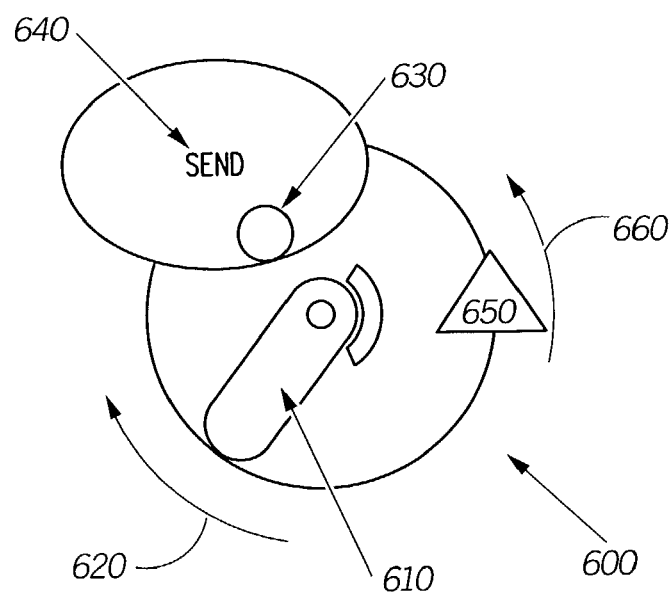
FIG. 6 is a diagram of a mechanical switch mechanism according to an embodiment of the invention.

FIG. 6 is a diagram of a mechanical switch mechanism 600 according to an embodiment of the invention. The mechanical switch mechanism 600 may contain an arm bar 610. When the key sequence "911" is detected, the 911-detect logic 160 may output a 911_detect control signal to a mechanical actuator (not shown). This mechanical actuator may be implemented as a rotary micro-motor, linear actuator or other drive mechanism. When the mechanical actuator receives the 911_detect control signal, it may become motorized to bias the arm bar 610 to travel in a specified direction 620. The arm bar 610 may travel in direction 620 until it is stopped by a rigid post or other stopper 630. This stopper 630 may be located under a "Send" key 640, and may be affixed to the "Send" key 640 or to the housing support structure (not shown) surrounding the "Send" key 640 or otherwise mounted.

The action of biasing the arm bar 610 such that it causes travel in direction 620 to make contact with the stopper 630 may be referred to as the load phase, and the switch mechanism 600 may be said to be loaded when the arm bar 610 is in contact with the stopper 630. When the arm bar 610 is in contact with the stopper 630, the user may depress the "Send" key 640. This may cause the "Send" key 640 to make physical contact with the arm bar 610, which in turn sets in motion the arm bar 610 to continue traveling in the specified direction 620 until it makes contact with a switch 650. When the arm bar 610 makes contact with the switch 650, power to the GPS receiver 110 may be enabled. The period of time during which the arm bar 610 is in contact with the switch 650 may be referred to as the release phase.

The operation of the mechanical switch 600 may further include a stage referred to as a restore phase. The mechanical switch 600 may enter the restore phase when it is determined that power to the GPS circuitry will not immediately be needed. This may occur when a call other than a 911 call is being made, when a 911 call is completed, when location data has successfully been obtained or otherwise.

Depending on the implementation of the invention, different inputs may trigger the mechanical switch 600 to enter the restore phase. If the 911-detect/control block 160 is implemented using a control processor operating with the control logic illustrated in FIG. 4 or that of FIG. 5, the mechanical switch 600 may enter the restore phase when the modem software asserts the switch_init control signal. If 911-detect/control block 160 is implemented according to control logic illustrated in FIG. 4, the mechanical switch mechanism 600 may also enter the restore phase when the control processor deasserts the 911_detect signal.

This difference in operation is due to the fact that the 911-detect/control block 160 may be implemented at least as either as a Mealy machine or as a Moore machine. The Moore machine illustrated in FIG. 4 asserts the 911_detect signal when the appropriate key sequence is detected, and does not deassert the signal until another key stroke is detected. For this reason, the GPS enabling block 140 used in conjunction with this type of control logic may be activated when the 911_detect signal is asserted, and deactivated when the 911_detect signal is deasserted. In contrast, the control processor illustrated in FIG. 5 operates as a Mealy machine and asserts the 911_detect signal only during the transition between states. For this reason, the GPS enabling block 140 used in conjunction with this type of control logic may be activated when the 911_detect signal is asserted, but may not be deactivated until the modem or other software asserts the switch_init signal.

During the restore phase, the mechanical actuator elements may be deactivated. This may cause the arm bar 610 to move in a second direction 660. If the switch 600 is implemented such that the arm bar 610 moves linearly, the second direction 660 may be the opposite direction of the first direction 620. If the switch 600 is implemented such that the arm bar 610 moves in an arc, the first direction 620 may be clockwise and the second direction 660 may be counterclockwise, or vice versa. During its return, the arm bar 610 may interface with the stopper 630. However, the arm bar 610 may be constructed such that it is rigid in the initial direction but compliant on the return direction. The arm bar may therefore be able to return to its original position.

Figure 7:
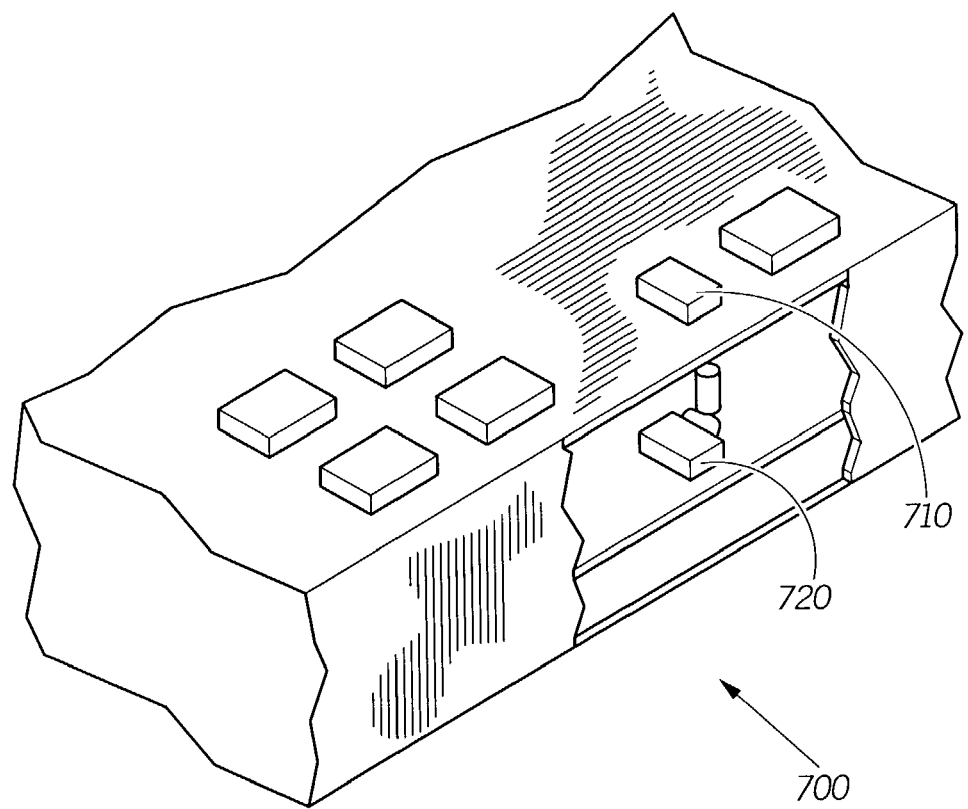
FIG. 7 is a diagram of a privacy bypass switching system according to an embodiment of the invention.

FIG. 7 is a diagram of a privacy bypass switching system 700 according to an embodiment of the invention. The privacy bypass switching system 700 is one possible implementation of the privacy bypass switch 170 illustrated in FIG. 1. The privacy bypass switch 700 may contain a privacy bypass button 710 which may be or include any button, switch, or software variable such that when the privacy bypass button is in an "on" state, power is enabled to the GPS circuitry, and software applications may request location information from the embedded GPS receiver 110.

In the privacy bypass system 700, when the user may engage the privacy bypass button 710, the button may make physical contact with a switch 720 located thereunder. In one embodiment, the privacy bypass switch 720 may be the same type of device as the 911-detect switch 650 which is controlled by the logic block 160. In this case, depressing the privacy bypass button 710 may provide a technique for closing the switch 720 that is independent of that described in conjunction with FIG. 6. In another embodiment, the privacy bypass switch 720 may be a separate switch from the 911-detect switch 650. In this case, the switch 720 may be incorporated into an alternate path between the power bus and the GPS receiver 110. This alternate path may circumnavigate the switch 650. For either implementation, when the privacy bypass button 710 is in the "on" state, power may be enabled to the GPS circuitry, and software applications may request location information from the embedded GPS receiver 110. This alternate path may circumnavigate the switch 650. For either implementation, when the privacy bypass button 710 is in the "on" state, power may be enabled to the GPS circuitry, and software applications may request location information from the embedded GPS receiver 110.

The foregoing description of the invention is illustrative, and modifications in configuration and implementation will occur to persons skilled in the art. For instance, while the invention has generally been described in terms of a hybrid cellular/GPS device, in embodiments other devices, such as two-way pagers, wireless network-enabled computers or other clients or devices may be configured with GPS protection according to the invention.

In another regard, while the invention has generally been described as activating or controlling the collection and/or transmission of GPS location data triggered upon an initial "9-1-1" keypad sequence, in embodiments the device may be controlled based upon other key sequences, for instance if future sequences were designated for emergency purposes, or otherwise. In yet another regard, while the invention has generally been described in terms of regulating the collection and/or transmission of GPS location data by applying or removing electrical power to associated circuits, in embodiments other actions may be taken to render GPS location data available or unavailable, such as by decoupling the GPS antenna when a key stroke sequence is detected. The scope of the invention is accordingly intended to be defined only by the following claims.

We claim:

1. A method for enabling operation of GPS circuitry in a mobile wireless device, the method comprising:
   disabling the GPS circuitry via a GPS enabling block of the mobile wireless device responsive to a user selection to disable the GPS circuitry, wherein disabling includes removing power from the GPS circuitry, and wherein the mobile wireless device otherwise remains operational, the disabling performed responsive to a user input to disable the GPS circuitry to prevent sending location data without consent of a user of the mobile wireless device;
   detecting, via detect/control circuitry disposed in the mobile wireless device, an input at a keypad of the mobile wireless device from a user of the mobile wireless device, the input representing an emergency call; and
   enabling the GPS circuitry despite prior disablement of the GPS circuitry by the GPS enabling block, by providing power to the GPS circuitry in spite of the user selection, performed by the detect/control circuitry, and performed upon detection of the input representing the emergency call.

2. The method of claim 1, wherein the step of detecting an input at a keypad of the mobile wireless device comprises detecting at least a predetermined sequence of key strokes representing an emergency call number and wherein the first key strokes of the predetermined sequence of key strokes comprise the key strokes "9-1-1."

3. The method of claim 1, wherein the mobile wireless device comprises a cellular telephone.

4. The method of claim 3, wherein the cellular telephone comprises an embedded GPS receiver.

5. A method for operating a mobile wireless device that includes GPS circuitry to determine location data associated with a location of the mobile wireless device and a user interface to accept one or more inputs from a user of the mobile wireless device, the method comprising:
   disabling the GPS circuitry responsive to a first user input, while otherwise maintaining operability of the mobile wireless device, so as to prevent wireless communication of location data determined by the GPS circuitry from the mobile wireless device without subsequent consent to communication of the location data by the user of the mobile wireless device;
   detecting at least a second user input representing an emergency call, but not consent to communication of the location data;

automatically enabling the GPS circuitry responsive to detecting the at least a second user input despite prior disablement of the GPS circuitry; and after automatically enabling the GPS circuitry, wirelessly communicating the location data despite a lack of consent from the user of the mobile wireless device.

6. The method of claim 5, wherein the user interface is a keypad and the at least a second user input includes entry of an emergency call number into the keypad.

7. The method of claim 6, wherein the emergency call number is 911.

8. A mobile wireless device comprising:

a user interface operable to receive one or more inputs from a user of the mobile wireless device;

GPS circuitry operable, when enabled, to determine location data associated with a location of the mobile wireless device;

a GPS enabling block coupled to the user interface and operable to selectively enable or disable the GPS circuitry, the GPS enabling block disabling the GPS circuitry responsive to a first user input so as to prevent wireless communication of location data determined by the GPS circuitry without subsequent user consent to communication of the location data;

detect/control circuitry coupled to the GPS circuitry and the user interface, the detect/control circuitry enabling the GPS circuitry, despite prior disablement of the GPS circuit, by the GPS enabling block, responsive to detecting at least a second user input representing an emergency call, but not consent to communication of the location data; and radio circuitry coupled to the detect/control circuitry and the GPS circuitry, the radio circuitry wirelessly communicating at least the location data despite a lack of consent to communication of the location data by the user.

* * * * *